United States Patent
Edwards et al.

(10) Patent No.: US 12,204,630 B2
(45) Date of Patent: Jan. 21, 2025

(54) IMAGE-BASED AUTHENTICATION

(71) Applicant: Capital One Services, LLC, McLean, VA (US)

(72) Inventors: Joshua Edwards, Philadelphia, PA (US); Michael Mossoba, Great Falls, VA (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 204 days.

(21) Appl. No.: 18/091,251

(22) Filed: Dec. 29, 2022

(65) Prior Publication Data

US 2024/0220595 A1 Jul. 4, 2024

(51) Int. Cl.
*G06T 11/00* (2006.01)
*G06F 21/36* (2013.01)
*G06V 20/30* (2022.01)

(52) U.S. Cl.
CPC .............. *G06F 21/36* (2013.01); *G06T 11/00* (2013.01); *G06V 20/30* (2022.01)

(58) Field of Classification Search
None
See application file for complete search history.

(56) References Cited

U.S. PATENT DOCUMENTS

| | | | | |
|---|---|---|---|---|
| 8,904,493 B1* | 12/2014 | Dibble | ................... | H04L 63/08 726/4 |
| 8,918,851 B1* | 12/2014 | Iannamico | ............. | G06F 21/36 726/7 |
| 9,288,196 B2* | 3/2016 | Shuster | ................... | G06F 21/36 |
| 11,003,756 B2* | 5/2021 | Gras | ........................ | G06F 21/45 |
| 11,481,481 B2* | 10/2022 | Tokie | .................... | G06F 16/583 |
| 11,755,708 B2* | 9/2023 | Walters | ............... | G06V 10/764 726/2 |
| 11,899,766 B2* | 2/2024 | Taher | ...................... | G06F 21/32 |
| 2004/0030934 A1* | 2/2004 | Mizoguchi | ............. | G06F 21/36 726/18 |
| 2004/0093527 A1* | 5/2004 | Pering | ..................... | G06F 21/36 726/19 |
| 2007/0094717 A1* | 4/2007 | Srinivasan | ............... | H04L 9/32 726/5 |
| 2008/0235285 A1* | 9/2008 | Della Pasqua | ....... | G06Q 10/107 |
| 2017/0346851 A1* | 11/2017 | Drake | ................... | H04L 9/0838 |
| 2024/0220595 A1* | 7/2024 | Edwards | ................ | G06T 11/00 |

* cited by examiner

*Primary Examiner* — Backhean Tiv
(74) *Attorney, Agent, or Firm* — Foley & Lardner LLP

(57) ABSTRACT

Disclosed embodiments and aspects thereof pertain to user authentication. An original image can be selected from an electronic device of a user. Computer-generated images can be based on the original image such that the computer-generated images appear similar but are distinguishable such that the user can recognize them as computer-generated. The original image and one or more computer-generated images can be conveyed to a user device for display and selection. The user can be authenticated based on user input identifying the original image.

20 Claims, 6 Drawing Sheets

IMAGE-BASED AUTHENTICATION

BACKGROUND

Authenticating users has become increasingly important, especially for users of mobile devices such as smartphones, tablets, or the like. Typically, users can be authenticated using one-time passwords, device authentication push notifications, or the like. However, suppose a person has physical access to the user's electronic device. In that case, a one-time password can be automatically displayed to the person trying to authenticate via the electronic device. A one-time password can thus be readily defeated by the person having physical access to the electronic device.

SUMMARY

The following presents a simplified summary of the disclosure to provide a basic understanding of some aspects. This summary is not an extensive overview of the disclosure. It is not intended to identify key/critical elements or to delineate the scope of the disclosure. Its sole purpose is to present some concepts in a simplified form as a prelude to the more detailed description presented later.

According to one aspect, disclosed embodiments can include a system that comprises a processor coupled to a memory that includes instruction associated with user authentication that, when executed by the processor, cause the processor to analyze a set of images associated with a user, determine a frequency of subjects that appear in the set of images, select an original image from the set of images associated with the user based on the frequency of subjects, produce one or more computer-generated images based on a subject in the image selected, trigger presentation of the image and one or more computer-generated images to the user, and verify an identity of the user based on user input identifying the original image. The instructions can further cause the processor to rank the set of images based on the frequency of subjects and select the original image with the highest frequency of appearances in the set of images. In one instance, the original image can include the face of the user. Additionally, or alternatively, the original image can include a family member, friend, or pet. The instructions can also cause the processor to access a social media account of the user with permission and capture the original image from the social media account of the user. Further, the instructions can cause the processor to determine a background and a subject of the original image, change the background of the original image to generate an edited image, and trigger presentation of the edited image to the user. The instructions can further cause the processor to capture a response time of the user to identify the original image, compare the response time to a threshold response time, and invalidate user authentication based on the response time satisfying the threshold response time. Further, the threshold response can be learned from previous user activity on an electronic device.

In accordance with another aspect, disclosed embodiments can include a method comprising executing, on a processor, instructions that cause the processor to perform operations associated with user authentication. The operations include selecting an original image from an electronic device associated with a user, producing computer-generated images based on the image, conveying the original image and the computer-generated images to a user device to present on a display of the user device, and authenticating the user based on user input identifying the original image. The operations can further comprise analyzing a set of images residing on the electronic device of the user, determining a frequency of two or more subjects that appear in the set of images, and selecting the original image from a second set of images that include a subject with the highest frequency. The original image can be the face of the user, a family member, a friend, or a pet. The operations further comprise accessing a social media account associated with the user with permission and capturing the original image from the social media account of the user. Further, the operations can include determining a background and a subject of the original image, redacting the background of the image to generate an edited image, and conveying the edited image to the user device to present on the display. The operations can also comprise authenticating the user based on the selection of the edited image. Furthermore, the operations can comprise capturing a response time of the user to identify the original image, comparing the response time to a threshold response time, and invalidating authentication of the user based on the response time exceeding the threshold response time. In one instance, the response time can be learned from previous user activity on the electronic device.

According to yet another aspect, disclosed embodiments can include a computer-implemented authentication method. The method comprises analyzing a set of images stored on an electronic device of a user, detecting a subject of each image in the set of images, determining a frequency of appearance of subjects of each image, generating a subset of the set of images comprising images that include appearance of the highest frequency subject, identifying a select image from the subset, producing computer-generated images based on the select image, conveying the select image and two or more computer-generated images to a user device for presentation on a display, and authenticating the user when the user identifies the select image. The computer-implemented method can further comprise selecting a second select image from the subset and authenticating the user based on whether the user identifies the select image and the second select image. Further, the method can comprise preventing authentication when at least one of the two or more computer-generated images are identified by the user.

To the accomplishment of the foregoing and related ends, certain illustrative aspects of the disclosure are described herein in connection with the following description and the annexed drawings. These aspects are indicative, however, of but a few of the various ways in which the principles of the disclosure can be employed, and the subject disclosure is intended to include all such aspects and their equivalents. Other advantages and novel features of the disclosure will become apparent from the following detailed description when considered in conjunction with the drawings.

BRIEF DESCRIPTION OF THE DRAWINGS

Aspects of the disclosure are understood from the following detailed description when read with the accompanying drawings. It is to be appreciated that elements, structures, or the like in the drawings are not necessarily drawn to scale. Accordingly, the dimensions of the same may be arbitrarily increased or reduced for clarity of discussion, for example.

DETAILED DESCRIPTION

Figure 1:
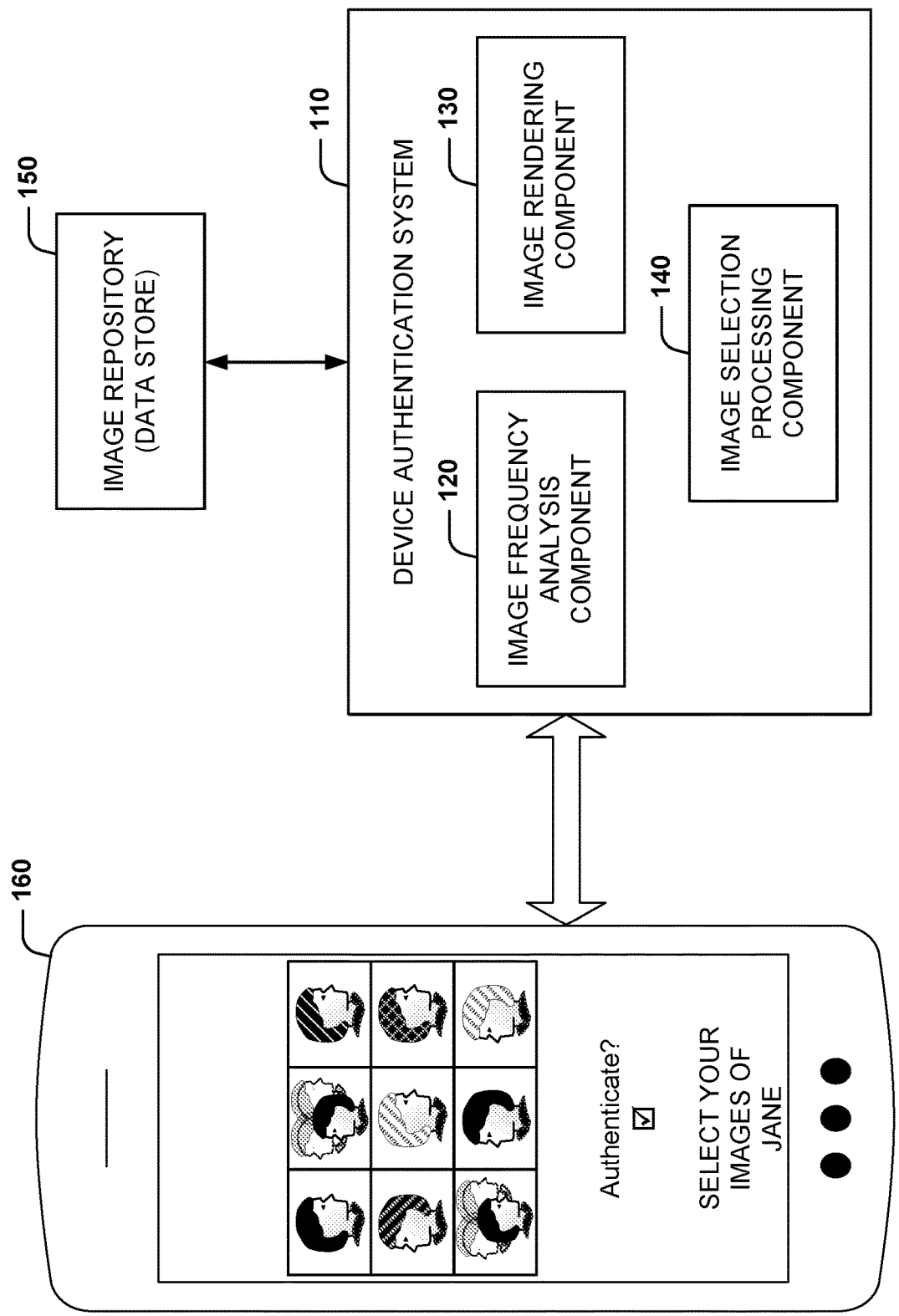
FIG. 1 illustrates a high-level diagram of an example implementation.

The disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the disclosure can be practiced without these specific details. In other instances, well-known structures and devices are shown in block diagram form in order to facilitate describing the disclosure.

FIG. 1 illustrates a high-level view of an example implementation of some aspects. A device authentication system 110 can include an image frequency analysis component 120, an image rendering component 130, and an image selection processing component 140. The device authentication system 110 can interface with an image repository 150 or an electronic device 160 associated with a user.

The device authentication system 110 can authenticate a user of the electronic device 160 to confirm the user's identity based on an authentication credential, such as knowledge specific to the user. The device authentication system 110 can select an image, video, or audio known to the user as the credential so that the user can authenticate themselves with the electronic device 160 based on that knowledge. In one embodiment, the credential can be an image of the face of the user. In another embodiment, the credential can be the voice of the user. In yet another embodiment, the credential can be an image or voice of a third party to the user.

The image repository 150 stores images, voice files, or both associated with the user and user account. In some embodiments, the image repository 150 resides locally on the electronic device 160. In other embodiments, the image repository 150 resides in a cloud storage solution. In yet another embodiment, the image repository 150 resides on a social media account associated with the user. For example, the data authentication system 110 can capture an authentication credential, such as an image, from the user's social media account.

The device authentication system 110 can include an image frequency analysis component 120. The image frequency analysis component 120 can access the image repository 150 to retrieve images, voice files, or both. The image frequency analysis component 120 can analyze a set of images to facilitate selecting an image for authenticating the user. The image frequency analysis component 120 can determine the frequency of a type of image based on a subject or context that appears in the set of images. The subject can correspond to an image's primary focus or point of interest. For example, the image frequency analysis component 120 can determine how many images in the set of images in the image repository 150 include a picture of the user alone or together with others. The image frequency analysis component 120 can output a count of the number of images or a frequency calculation (e.g., a percentage) of an image.

In some embodiments, the image frequency analysis component 120 can select an image type with the highest frequency of subject appearances in the images, such as a picture of the user or the user's pet. In other embodiments, the image frequency analysis component 120 can rotate a selection of amongst a ranked list of a set of the highest frequency image types that appear. In another embodiment, the image frequency analysis component 120 can select the image for authentication based on history or a frequency of previous use for authenticating the user.

The data authentication system 110 can include an image rendering component 130. The image rendering component 130 can produce a computer-generated image based on the subject or context selected by the image frequency analysis component 120. The image rendering component 130 can generate alternate computer-generated images that look similar to real or original images but do not accurately portray the subject or context, among other features. For example, the image rendering component 130 can receive a selection of a facial image of the user. The image rendering component 130 can generate images of a face that looks similar to the face of the user but is different enough that the user can readily identify the image as computer-generated (e.g., different eye color, addition of a mole, or removal of birthmark). The image selection processing component 140 can present computer-generated and real or original images to the user on the electronic device 160.

In some embodiments, the image rendering component 130 can alter or change the image or image subject or context selected by the image frequency analysis component 120. The image rendering component 130 can determine a background of an image and redact, obscure, or edit the background to generate an edited image. For example, the image can be of the user in front of the Statue of Liberty. The image rendering component 130 can redact the Statue of Liberty from the image. Alternatively, the image rendering component 130 can blur the Statue of Liberty. In another embodiment, the image rendering component 130 can change the Statue of Liberty in the background to a different background (e.g., change from the Statue of Liberty to the Washington Monument). Altering the background of the image can provide extra security such that the user is only looking at the subject (e.g., face of the user in the image) without using context clues to authenticate themselves on the electronic device. Further, the user may recognize the image as computer generated when the user is positioned in front of the Washington Monument when they have not visited the Washington Monument or took a different picture than presented. The image selection processing component 140 can present the edited images to the user via the electronic device 160 and computer-generated images.

The image selection processing component 140 can generate interactive views to be presented to the user through the electronic device 160, or more particularly, a screen of the electronic device 160. The image selection processing component 140 can generate a grid or list of images made up of real and computer-generated images to be displayed to the user via the electronic device 160. The electronic device 160 can receive input through touchscreen clicks, text entries, numbered entries, or the like. The image selection processing component 140 can receive one or more input selections from the user through the electronic device 160. A selection made by the user can be touchscreen clicks, entries indicative of a position of the selection, unique identifiers associated with an image on the grid, or the like. The image selection processing component 140 can compare the selections made by the user to a rubric or guide of which items on the grid are real images and which are computer-generated. The image selection processing component 140 can authenticate the user based on whether the user can identify one or more real images as the authentication credential. The image selection processing component 140 can verify the user's identity when the user selects the correct image or images that are real as opposed to computer generated.

In some embodiments, the image selection processing component 140 can capture the user's response time as an additional authentication credential. The image selection processing component 140 can compare the response time to a threshold response time. Suppose the response time exceeds the threshold response time. In that case, the image selection processing component 140 can prevent or invalidate the authentication of the user based on the response time exceeding a threshold response time. In some embodiments, the image selection processing component 140 can determine or learn the threshold response time from previous user activity on the electronic device 160. The threshold response time can be learned using a machine learning algorithm or the like. Of course, other factors can also be considered as part of authentication processing and credentialing.

For clarity, the example implementation has been described using real/original/authentic images, computer-generated images, and presenting the images on a display for selection. However, it is appreciated that credentialing can take other forms. For example, authentic voice files/recordings can be used with computer-generated voice files. The authentic voice files and the computer-generated voice files can be displayed and played for the user. The user can authenticate themselves by selecting authentic voice files or not selecting computer-generated ones. Other credentialing contemplated can be video and biometric data (e.g., gait analysis data, fingerprint images, iris biometric data).

Figure 2:
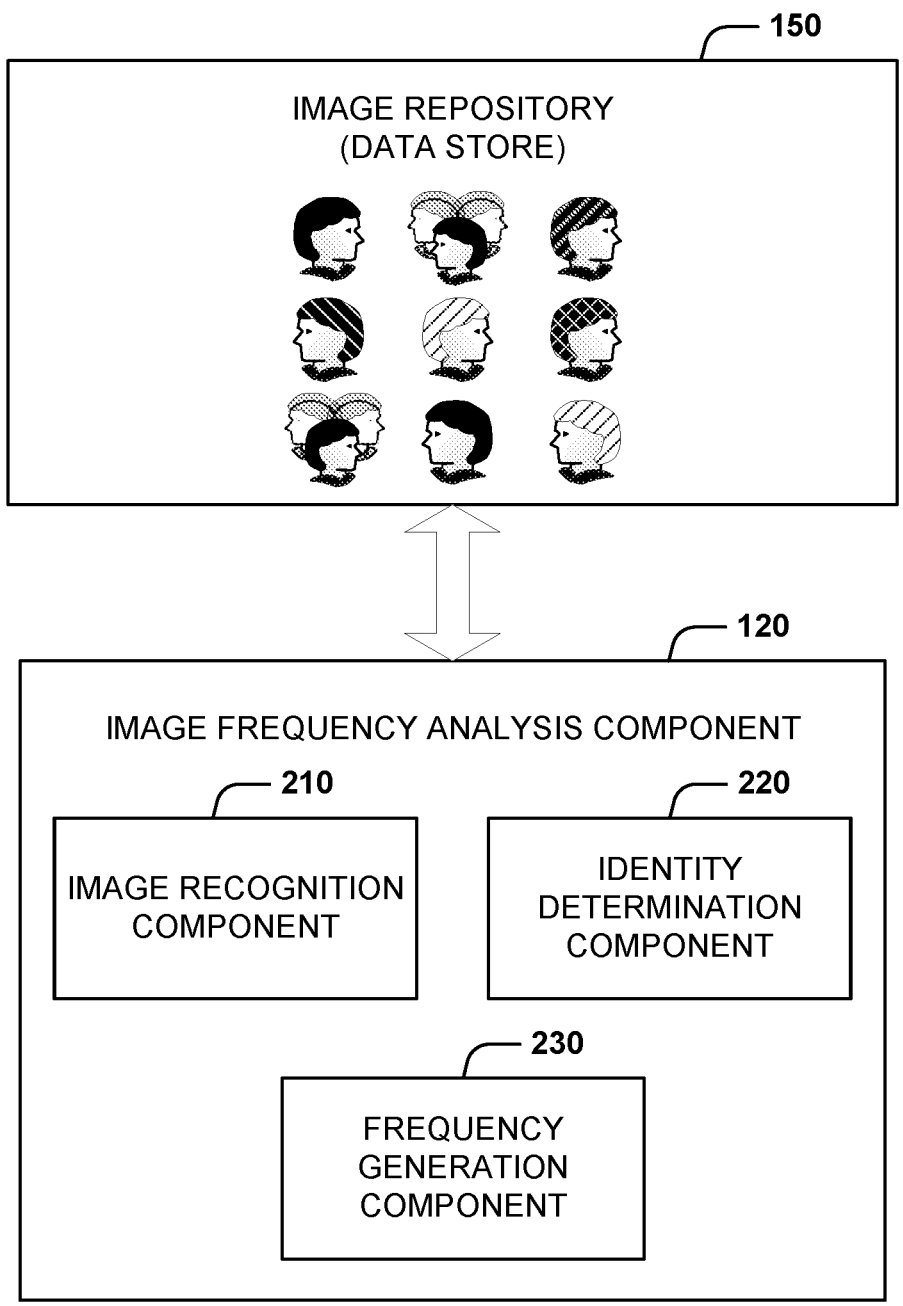
FIG. 2 illustrates an example component diagram of an image frequency analysis component.

FIG. 2 illustrates a detailed component diagram of the image frequency analysis component 120. The image frequency analysis component 120 can include an image recognition component 210, an identity determination component 220, and a frequency generation component 230. The image recognition component 210 can access the image repository 150 to retrieve authentic images, voice files, or both. The image recognition component 210 can sort through files on the electronic device 160 to recognize images as authentic that reside on the electronic device 160.

The image recognition component 210 can pass the set of images or image files to the identity determination component 220. The identity determination component 220 can determine the identities of the subject, such as people or items in the image files. The identity determination component 220 can utilize a classification algorithm, a facial recognition technique, computer vision, deep learning, or the like to make such a determination. In some embodiments, the identity determination component 220 can match faces in the images to social media data of the user to identify the user or social media contacts of the user. In other embodiments, the identity determination component 220 can create unique identifiers for each unique face appearing in the set of images or image files. The identity determination component 220 can apply metadata with the identifications or classifications to the set of images. For example, an image that includes the user and the user's dog can have metadata indicating that the user and the user's dog appear in the image.

The frequency generation component 230 can determine the frequency of subjects or context that appear in the set of authentic images. The frequency generation component 230 can determine the frequency at which a subject appears in the set of images. For example, the frequency generation component 230 can determine how many images in the set include a picture of the user's dog. The frequency generation component 230 can output a count of the number of images or a frequency calculation (e.g., a percentage) for the images. In some embodiments, the frequency generation component 230 can analyze the metadata applied by the identity determination component 220 to determine the frequency that a subject appears in the images.

Figure 3:
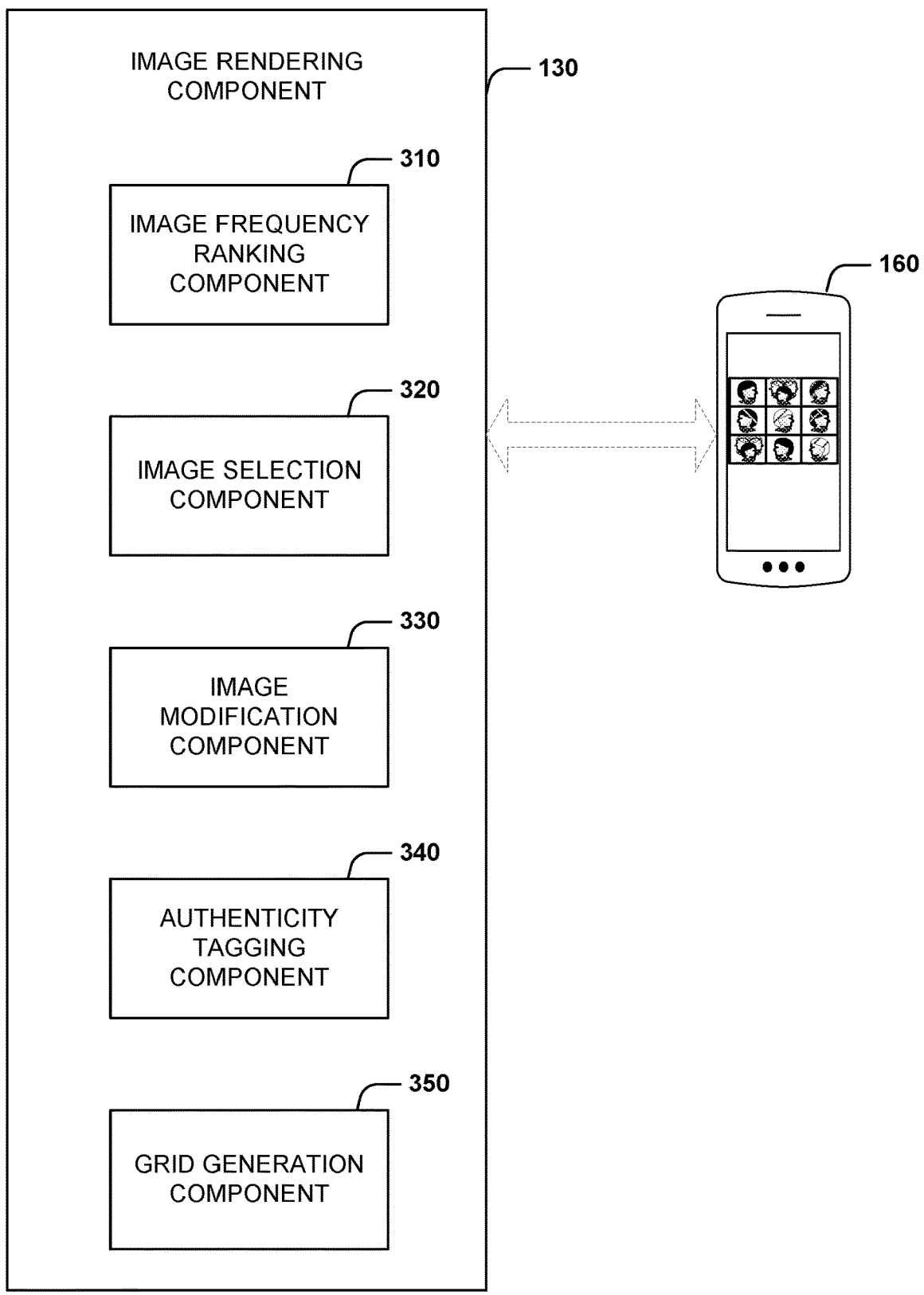
FIG. 3 illustrates an example component diagram of an image rendering component.

FIG. 3 illustrates a component diagram of the image rendering component 130 in further detail. The image rendering component 130 can include an image frequency ranking component 310, an image selection component 320, an image modification component 330, an authenticity tagging component 340, and a grid generation component 350. The image frequency ranking component 310 can receive the frequency of each subject appearing in the set of images from the frequency generation component 230. The image frequency ranking component 310 can compute a ranking of each subject based on the frequency of each subject.

The image selection component 320 can select the image for authenticating the user. In other words, the image selection component 320 identifies the image or set of images that serve as an authentication credential. The image selection component 320 can select an image with a subject with the highest frequency of appearances in the set of images. In other embodiments, the image frequency analysis component 120 can rotate a selection of the images amongst the ranked list of a set of the highest frequency subjects that appear in the set of images. In another embodiment, the image frequency analysis component 120 can select the image for authentication based on history or a frequency of previous use for authenticating the user (e.g., previously used pet image, friend image). In another embodiment, the image selection component 320 can select multiple images that include a subject. For example, the image selection component can select nine images that include the face of a user's friend.

The image rendering component 130 can include an image modification images based on the real or authentic images that were selected by the image selection component 320. The image modification component 330 can generate an alternate computer-generated image that looks similar to the real image but does not accurately portray the real image. For example, the image modification component 330 can receive a selection of a facial image of the user's friend. The image modification component 330 can generate images of a face that looks similar to the face of the user's friend but is different enough that the user can readily identify the image as a computer-generated image (e.g., an inauthentic face of the user's friend).

In some embodiments, the image modification component 330 can receive a subset of images selected by the image selection component 320 (e.g., nine images that include a particular subject). The image modification component 330 can modify one or more of the subset of images such that they are altered to be inauthentic. For example, the image modification component 330 can alter the faces of the user's friend in six of the nine selected images.

In some embodiments, the image modification component 330 can alter or change the context of an image selected by the image frequency analysis component 120. The image modification component 330 can determine a background and a subject of a real image and redact, obscure, or edit the background to generate an edited image. For example, the selected image could be a picture of the user's friend in front of their childhood home. The image modification component 330 can redact the childhood home from the image.

Alternatively, the image modification component 330 can blur the childhood home. In another embodiment, the image modification component 330 can change the childhood home in the background to a different background (e.g., change from the childhood home to a generic stock image of a house). Altering the background of the authentic image can provide extra security such that the user is only looking at the subject (e.g. face of the user's friend in the image) without using context clues to authenticate themselves on the electronic device. However, modification can also be utilized as a basis for user authentication. For example, the user could be required to identify the original image from a plurality of modified images.

The image rendering component 130 can include an authenticity tagging component 340. The authenticity tagging component 340 can generate metadata or tags for real and computer-generated images. The authenticity tagging component 340 can apply metadata to the image to indicate them as "authentic" or "real" for purposes of authenticating the user. The authenticity tagging component 340 can apply metadata to the computer-generated images as "inauthentic" for purposes of authenticating the user.

The image rendering component 130 can include a grid generation component 350. The grid generation component 350 can organize the authentic and computer-generated images into a view displaying them to the user on the electronic device 160. In some embodiments, the grid generation component 350 can stitch together all images into a single view, with each image being clickable on a touchscreen to accept a user selection. In other embodiments, the grid generation component 350 can generate a series of views of each image or pairs of images. The series of views can include selectable buttons or clickable images to accept user selection of authentic images over computer-generated images.

The grid generation component 350 can generate interactive views to be presented to the user via the electronic device 160 and/or a screen of the electronic device 160. The grid generation component 350 can generate a grid or list of images made up of authentic and computer-generated images to be displayed to the user via a display of the electronic device 160. The electronic device 160 can receive touchscreen clicks, text entries, numbered entries, and/or the like.

Figure 4:
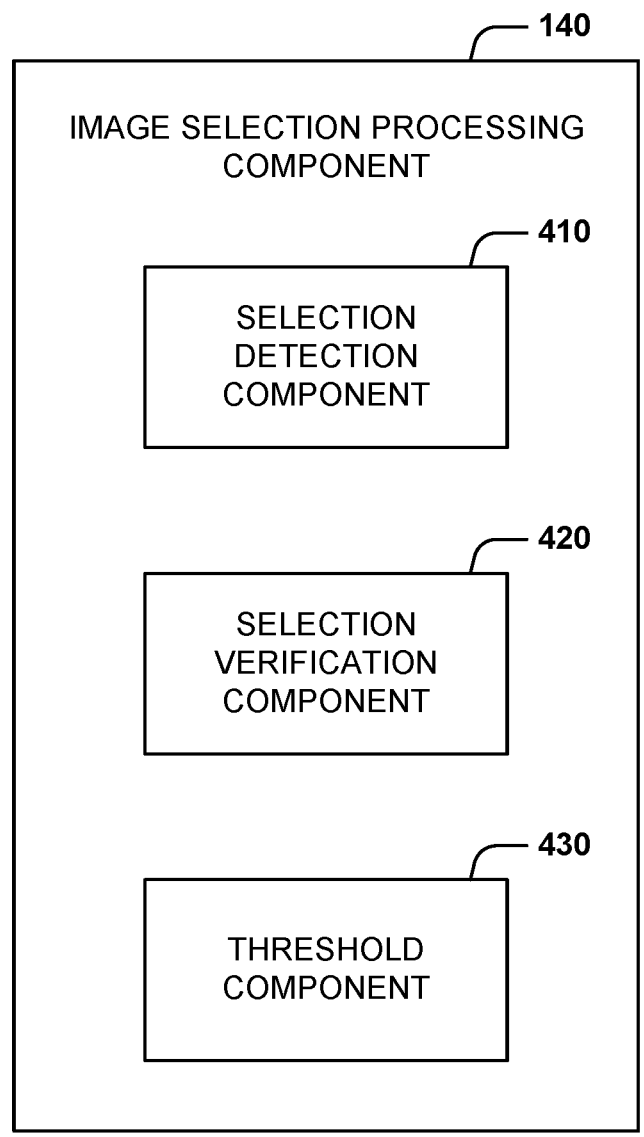
FIG. 4 illustrates an example component diagram of an image selection processing component.

FIG. 4 illustrates a detailed component diagram of the image selection processing component 140. The image selection processing component 140 can include a selection detection component 410, a selection verification component 420, and a threshold component 430. The selection detection component 410 can detect selections from the user on the electronic device 160. The selection detection component 410 can detect touchscreen clicks, entries indicative of a position of the selection, unique identifiers associated with an image on the grid, button selections, and/or the like.

The selection verification component 420 can compare the selections made by the user to a rubric or guide of which items on the grid are authentic and which are computer-generated. The selection verification component 420 can authenticate the user based on whether the user is able to identify the authentic or real image. The selection verification component 420 can authenticate the user via the electronic device 160 when the user selects the authentic image and does not select the computer-generated images. In some embodiments, the selection verification component 420 can authenticate the user by comparing the selections made by the user to metadata or tags applied to the images shown to the user. The selection verification component 420 authenticates the user upon confirming that the user has selected each image tagged as "authentic" or has not selected any images tagged as "inauthentic."

The image selection processing component 140 can include a threshold component 430. The threshold component 430 can capture a response time of the user to identify the authentic image. The threshold component 430 can compare the response time to a threshold response time. If the response time exceeds the threshold response time, the threshold component 430 can prevent and/or invalidate user authentication based on the response time exceeding a threshold response time. In some embodiments, the threshold component 430 can determine or learn the threshold response time from previous user activity on the electronic device 160. The threshold response time can be learned using a machine learning algorithm and/or the like. For example, the threshold component 430 can monitor user interactions with the electronic device 160 to learn a response time that the user typically has. The threshold component 430 can apply a threshold equal to or within an error factor of the learned response time.

Figure 5:
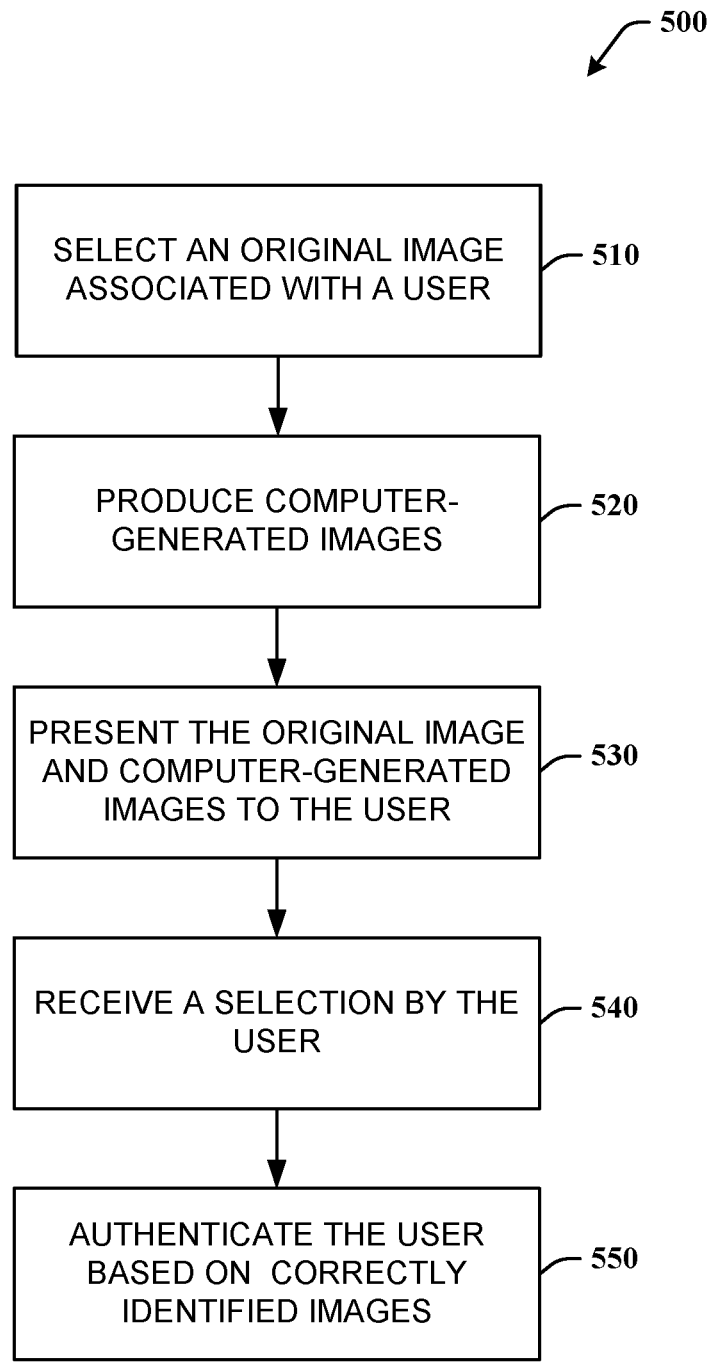
FIG. 5 illustrates a method of image-based user authentication.

Regarding FIG. 5, an example method 500 is depicted for image-based authentication. While, for purposes of simplicity of explanation, the one or more methodologies shown herein, e.g., in the form of a flow chart, are shown and described as a series of acts, it is to be understood and appreciated that the subject disclosure is not limited by the order of acts, as some acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosure. It is also appreciated that the method 500 is described in conjunction with a specific example for explanation purposes.

FIG. 5 illustrates a method 500 of image-based user authentication. The method 500 can be implemented by the device authentication system 110 and various components thereof.

At numeral 510, the method 500 can select an authentic or real image associated with a user. For example, the device authentication system 110 can access an image repository 150 of the user and select an image for use in authentication. The device authentication system 110 can select the image based on the frequency that a subject appears in the image repository 150.

At 520, the method 500 can produce a computer-generated image. The device authentication system 110 can produce a computer-generated image based on the authentic image that was selected. The computer-generated images can be similar to the authentic image but distinguishable such that a user can be recognized the image as computer-generated. According to one embodiment, the device authentication system 110 can utilize artificial intelligent ("AI") tools for facial generation, such as a generative adversarial network ("GAN"). Those skilled in the art would understand that a GAN may be described as a generative model used to generate imitation or "fake" elements such as images, audio, videos, etc. An exemplary GAN can contain two neural networks, namely, a generator and a discriminator, wherein the generator generates new random data patterns, and the discriminator classifies the data pattern generated as real (i.e., belonging to the original training set) or fake.

At numeral 530, the method 500 can present the authentic image(s) and the computer-generated images to the user. The device authentication system 110 can generate a grid or a view, including images that include authentic and computer-generated images. The view can be conveyed to the electronic device 160 for presentation to a user on a display.

At 540, the method can receive one or more image selections made by the user. The user can select the authentic or real images to authenticate themselves as the user via the electronic device 160. The device authentication system 110 can receive the selections from the electronic device 160.

At reference numeral 550, the method 500 authenticates the user based on correctly identified images. The device authentication system 110 can authenticate the user upon confirming that the user has selected each authentic image or has not selected any computer-generated images.

As disclosed herein, authentication can be based on a user's ability to distinguish between two types of images. The first type is referred to as real, original, or authentic, and the second type is described as computer generated or inauthentic. It is recognized the images can be deemed computer-generated when captured by a device such as a smartphone camera. Further, some images can be edited to include filters, text, or other adjustments made with a computer. However, that is not the intended meaning. Real, authentic, or original images include those that were composed and optionally edited by a user or the user's friend, family member, or the like and should be recognized by the user. By contrast, images termed computer generated or inauthentic are those that are automatically generated, for example, utilizing artificial intelligence or other technology to generate an image that can be similar to a real, authentic, or original image or completely different. Furthermore, in one embodiment, real image can be altered such as by removal of the background by a computer algorithm and can still be regarded as a real, original, or authentic image or be regarded as computer generated, for example if the background is replaced with a different background. In other words, images can be classified into one of two types of image to enable authentication based on input selecting a predetermined type of image.

The subject disclosure has focused on using select and computer-generated images in an authentication process. However, other types of authentication credentials can be employed, including a sequence of images or video as well as audio. For example, a real video of a user speaking can be selected, and computer-generated videos can be produced that alter some aspect of the video, such as the subject, background, or voice. Authentication can then be performed based on the ability of a user to identify the real or authentic video.

As used herein, the terms "component" and "system," as well as various forms thereof (e.g., components, systems, sub-systems), are intended to refer to a computer-related entity, either hardware, a combination of hardware and software, software, or software in execution. For example, a component may be but is not limited to a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 6:
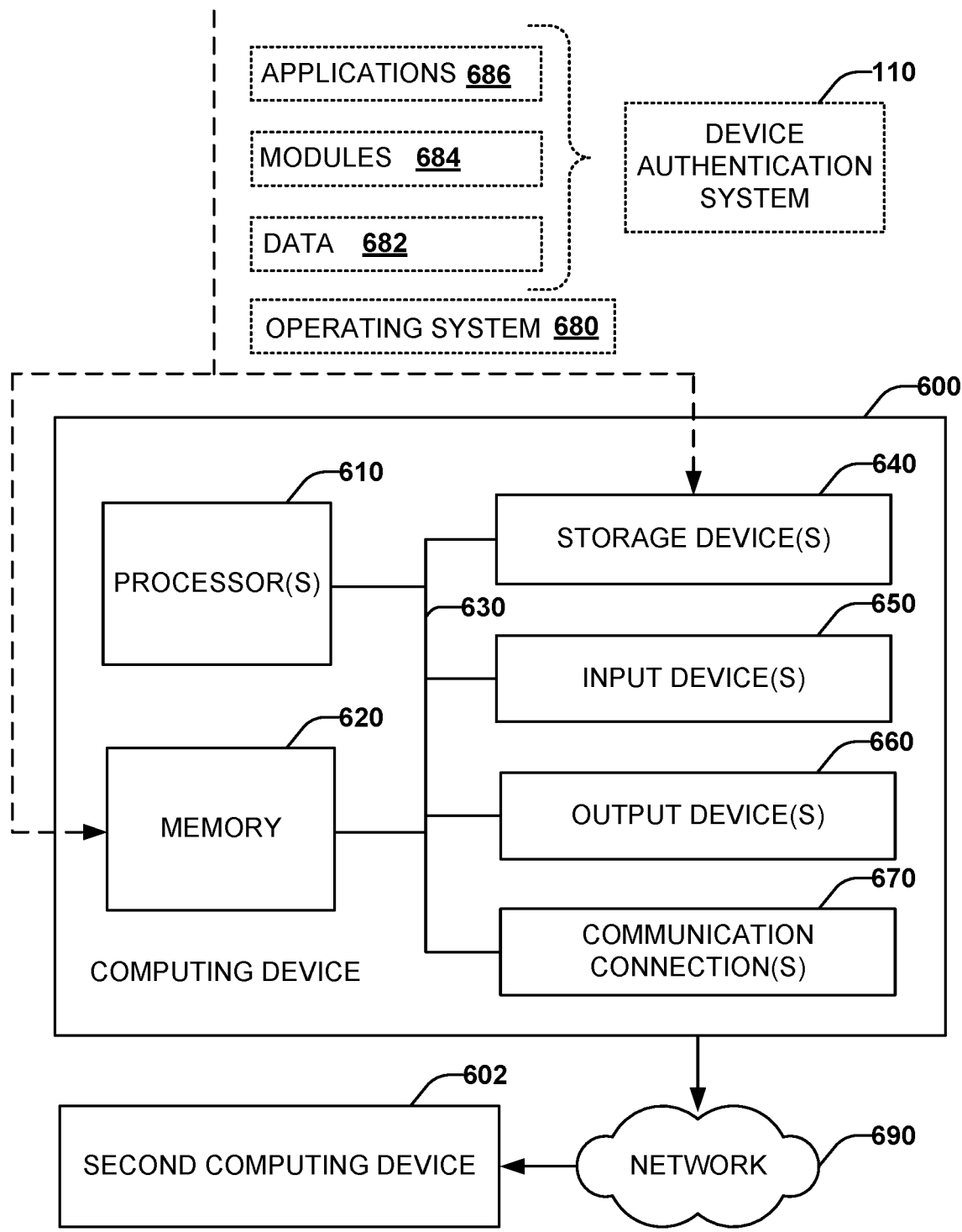
FIG. 6 illustrates a computing environment where some of the provisions set forth herein can be implemented.

To provide a context for the disclosed subject matter, FIG. 6, as well as the following discussion, are intended to provide a brief, general description of a suitable environment in which various aspects of the disclosed subject matter can be implemented. However, the suitable environment is solely an example and is not intended to suggest any limitation on the scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, and data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all, aspects of the disclosed subject matter can be practiced on stand-alone computers. In a distributed computing environment, program modules may be located in one or both of local and remote memory devices.

With reference to FIG. 6, illustrated is an example computing device 600 (e.g., desktop, laptop, tablet, watch, server, hand-held, programmable consumer or industrial electronics, set-top box, game system, compute node, . . . ). The computing device 600 includes one or more processor(s) 610, memory 620, system bus 630, storage device(s) 640, input device(s) 650, output device(s) 660, and communications connection(s) 670. The system bus 630 communicatively couples at least the above system constituents. However, the computing device 600, in its simplest form, can include one or more processors 610 coupled to memory 620, wherein the one or more processors 610 execute various computer-executable actions, instructions, and or components stored in the memory 620.

The processor(s) 610 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 610 may also be implemented as a combination of computing devices, for example, a combination of a DSP and a microprocessor, a plurality of microprocessors, multi-core processors, one or more microprocessors in conjunction with a DSP core, or any other such configuration. In one configuration, the processor(s) 610 can be a graphics processor unit (GPU) that performs calculations concerning digital image processing and computer graphics.

The computing device 600 can include or otherwise interact with a variety of computer-readable media to facilitate control of the computing device to implement one or more aspects of the disclosed subject matter. The computer-readable media can be any available media accessible to the computing device 600 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD)), and solid-state devices (e.g., solid-state drive (SSD), flash memory drive (e.g., card, stick, key drive)), or any other like mediums that store, as opposed to transmit or communicate, the desired information accessible by the computing device 600. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 620 and storage device(s) 640 are examples of computer-readable storage media. Depending on the configuration and type of computing device, the memory 620 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 600, such as during start-up, can be stored in non-volatile memory, while volatile memory can act as external cache memory to facilitate processing by the processor(s) 610, among other things.

The storage device(s) 640 include removable/non-removable, volatile/non-volatile storage media for storage of vast amounts of data relative to the memory 620. For example, storage device(s) 640 include, but are not limited to, one or more devices such as a magnetic or optical disk drive, floppy disk drive, flash memory, solid-state drive, or memory stick.

Memory 620 and storage device(s) 640 can include, or have stored therein, operating system 680, one or more applications 686, one or more program modules 684, and data 682. The operating system 680 acts to control and allocate resources of the computing device 600. Applications 686 include one or both of system and application software and can exploit management of resources by the operating system 680 through program modules 684 and data 682 stored in the memory 620 and/or storage device(s) 640 to perform one or more actions. Accordingly, applications 686 can turn a general-purpose computer 600 into a specialized machine in accordance with the logic provided thereby.

All or portions of the disclosed subject matter can be implemented using standard programming and/or engineering techniques to produce software, firmware, hardware, or any combination thereof to control the computing device 600 to realize the disclosed functionality. By way of example and not limitation, all or portions of the device authentication system 110 can be, or form part of, the application 686, and include one or more program modules 684 and data 682 stored in memory and/or storage device(s) 640 whose functionality can be realized when executed by one or more processor(s) 610.

In accordance with one particular configuration, the processor(s) 610 can correspond to a system on a chip (SOC) or like architecture including, or in other words integrating, both hardware and software on a single integrated circuit substrate. Here, the processor(s) 610 can include one or more processors as well as memory at least similar to the processor(s) 610 and memory 620, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the device authentication system 110 and/or functionality associated therewith can be embedded within hardware in a SOC architecture.

The input device(s) 650 and output device(s) 660 can be communicatively coupled to the computing device 600. By way of example, the input device(s) 650 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 660, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 650 and output device(s) 660 can be connected to the computing device 600 by way of a wired connection (e.g., bus), wireless connection (e.g., Wi-Fi, Bluetooth), or a combination thereof.

The computing device 600 can also include communication connection(s) 670 to enable communication with at least a second computing device 602 utilizing a network 690. The communication connection(s) 670 can include wired or wireless communication mechanisms to support network communication. The network 690 can correspond to a local area network (LAN) or a wide area network (WAN) such as the Internet. The second computing device 602 can be another processor-based device with which the computing device 600 can interact. In one instance, the computing device 600 can execute a device authentication system 110 for a first function, and the second computing device 602 can execute a device authentication system 110 for a second function in a distributed processing environment. Further, the second computing device can provide a network-accessible service that stores source code and encryption keys, among other things, that can be employed by the device authentication system 110 executing on the computing device 600.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
a processor coupled to a memory that includes instructions associated with user authentication that, when executed by the processor, cause the processor to:
analyze a set of images associated with a user;
determine a frequency of subjects that appear in the set of images;
select an original image from the set of images associated with the user based on the frequency of subjects;
produce one or more computer-generated images based on a subject in the original image selected;
trigger presentation of the original image and one or more computer-generated images; and
verify an identity of the user based on user input identifying the original image.

2. The system of claim 1, wherein the instructions further cause the processor to:
generate a ranking of the set of images based on the frequency of the subjects; and
select the original image that has a highest frequency of appearances in the set of images.

3. The system of claim 1, wherein the original image includes a face of the user.

4. The system of claim 1, wherein the original image includes one of a family member, friend, or pet.

5. The system of claim 1, wherein the instructions further cause the processor to:
access a social media account of the user with permission; and
capture the original image from the social media account of the user.

6. The system of claim 1, wherein the instructions further cause the processor to:
determine a background and a subject of the original image;
change the background of the original image to generate an edited image; and
trigger presentation of the edited image to the user.

7. The system of claim 1, wherein the instructions further cause the processor to:
capture a response time of the user to identify the original image;
compare the response time to a threshold response time; and
invalidate authentication of the user based on the response time satisfying the threshold response time.

8. The system of claim 7, wherein the threshold response time is learned from previous user activity on an electronic device.

9. A method, comprising:
executing, on a processor, instructions that cause the processor to perform operations associated with user authentication, the operations comprising:
selecting an original image from an electronic device associated with a user;
producing computer-generated images based on the original image;
conveying the original image and the computer-generated images to a user device to present on a display of the user device; and
authenticating the user based on user input identifying the original image.

10. The method of claim 9, wherein selecting the original image further comprises:
analyzing a set of images residing on the electronic device of the user;
determining a frequency of two or more subjects that appear in the set of images; and
selecting the original image from a second set of images that include a subject with a highest frequency.

11. The method of claim 9, wherein the original image is an image of the face of the user.

12. The method of claim 9, wherein the original image is an image of a family member, friend, or pet.

13. The method of claim 9, wherein the operations further comprise:
accessing a social media account associated with the user with permission; and
capturing the original image from the social media account of the user.

14. The method of claim 9, wherein the operations further comprise:
determining a background and a subject of the original image;
redacting the background of the original image to generate an edited image; and
conveying the edited image to the user device to present on the display.

15. The method of claim 14, wherein the operations further comprise authenticating the user based on selection of the edited image.

16. The method of claim 9, wherein the operations further comprise:
capturing a response time of the user to identify the original image;
comparing the response time to a threshold response time; and
invalidating authentication of the user based on the response time exceeding the threshold response time.

17. The method of claim 16, wherein the threshold response time is learned from previous user activity on the electronic device.

18. A computer-implemented authentication method, comprising:
analyzing a set of images stored on an electronic device of a user;
detecting a subject of each image in the set of images;
determining a frequency of appearance of subjects of each image;
generating a subset of the set of images comprising images that include appearance of the highest frequency subject;
identifying a select image from the subset;
producing computer-generated images based on the select image;

conveying the select image and two or more computer-generated images to a user device for presentation on a display; and authenticating the user when the user identifies the select image.

19. The computer-implemented authentication method of claim 18, further comprising:

selecting a second select image from the subset; and authenticating the user based on whether the user identifies the select image and the second select image.

20. The computer-implemented authentication method of claim 18, further comprises preventing authentication when at least one of the two or more computer-generated images are identified by the user.

* * * * *